INVENTOR.
JOHN L. PORTER
ATTORNEY

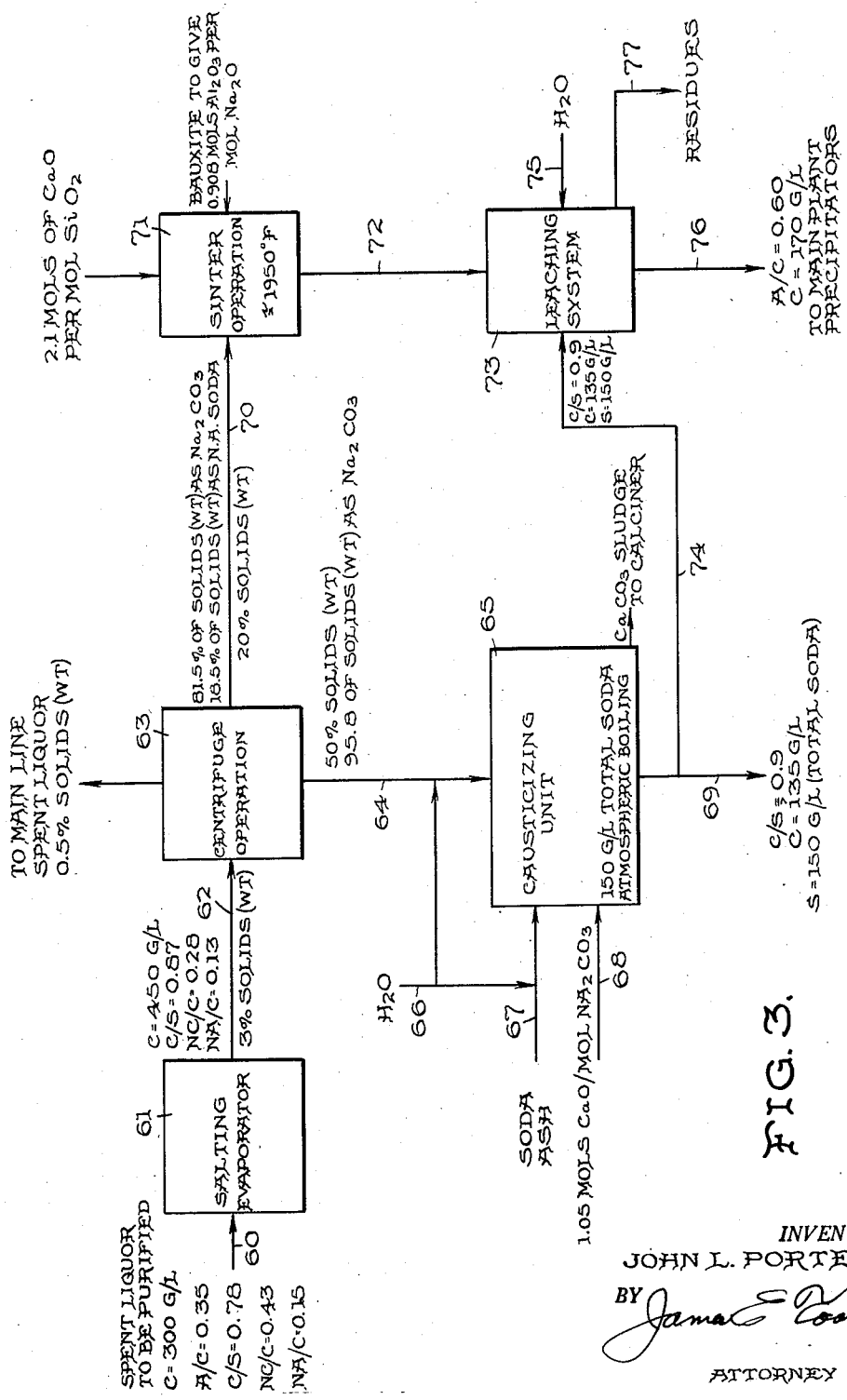

United States Patent Office

2,889,982
Patented June 9, 1959

2,889,982

PROCESS OF PURIFYING CAUSTIC ALUMINATE LIQUORS

John L. Porter, Baton Rouge, La., assignor to Kaiser Aluminum & Chemical Corporation, Oakland, Calif., a corporation of Delaware Application November 25, 1952, Serial No. 322,515

5 Claims. (Cl. 233—18)

This invention in its most generic aspect relates to a method and apparatus for the selective separation of two or more solids of different specific gravities and/or particle sizes from a liquid of lower density. More particularly the invention relates to a novel system of centrifuges and a method to effect the removal of precipitates of microscopic and sub-microscopic particle sizes from a viscous liquor, and thereafter to separate the solids of the resulting higher solids slurry into fractions of different specific gravities and/or particle sizes. Specifically, the invention is directed to a novel method and combination of apparatus for the selective separation of a sodium carbonate fraction from the other precipitates, such as organic salts, which form during the concentration of caustic aluminate liquor utilized in the wet alkali aluminate or well known Bayer process for alumina production.

This application is a continuation-in-part of my copending application, Serial No. 262,808 filed December 21, 1951 and now abandoned, relating to a Bayer liquor purification process involving the removal of sodium carbonate and organic substances, which latter in the solubilized state adversely affects the settling characteristics of the red mud or ore residues from an alkaline digest, and the precipitation of alumina in the auto-precipitation phase of the Bayer process.

The slimy gelatinous nature of the precipitates formed by concentrating the circulating caustic aluminate liquors creates difficulty in effecting the necessary separation thereof from the viscous caustic liquor. In addition, it is highly desirable to provide a method and means of separating the precipitated carbonate from the organic solids, since the former is amenable to direct treatment by causticizing for recovery of the soda as caustic, while the latter is not. As herein used, the term "causticize" refers to the conventional and well known practices of converting solubilized soda ash or sodium carbonate to caustic soda by treatment with lime, such as a slaked lime, to form insoluble calcium carbonate and caustic soda. Conversely, "non-causticizable" when used with reference to sodium compounds refers to the inability of lime or slaked lime, when used in the conventional lime causticizing reaction, to convert the soda values to caustic soda.

This invention is directed to a specific method and centrifugal system particularly applicable in the removal of such precipitates from the concentrated liquor and the separation of the sodium carbonate solids and the organic solids.

The normal circulating Bayer process caustic aluminate liquor contains relatively large quantities of dissolved sodium carbonate and smaller quantities of a complex mixture of solubilized or dissolved sodium organic substances, including salts, which are formed in the caustic liquor from the organic matter, such as humus, present in the ore, and from the starch which is generally employed as a flocculating agent in settling the red mud residue of the ore by the usual decantation operation. The process liquor is progressively contaminated with these organic substances or sodium organic compounds (designated collectively as sodium organates) and also by sodium carbonate, the latter representing the so-called process carbonation of the liquor, a term used generally throughout the industry. Process carbonation involves the accumulation of sodium carbonate in the liquor from such sources as (1) the progressive degradation of sodium organates of more or less higher molecular weight into this more or less ultimate form, (2) pick-up of carbon dioxide from the atmosphere by the caustic soda, and (3) introduction of soda ash as such into the process liquor from the lime-soda causticizing reaction when conducted either inside or outside the main liquor stream for producing make-up caustic. This sodium carbonate, although not fatal to satisfactory mud settling and alumina precipitation, represents an inventory of valuable soda in the system which must be rectified to caustic soda for use in extraction of alumina from the ore charges, and to maintain a proper balance between the free caustic and the total soda in the system.

This contaminating fraction of the total sodium content of the liquor is denominated herein as the "non-caustic soda" since it is not present as free caustic soda and therefore not available to form sodium aluminate. The fraction of the non-caustic soda which includes the organic substances or sodium organates is designated herein as "non-alkaline soda," since it comprises sodium compounds most of which are not acid titratable. The balance of the non-caustic soda is the sodium carbonate. Thus, non-caustic soda=non-alkaline soda+$Na_2CO_3$, the latter being directly causticizable with lime, while the non-alkaline soda is substantially non-causticizable.

The total non-alkaline soda, which includes the sodium organates, as well as inorganic sodium compounds such as silicates, phosphates, vanadates, chlorides and sulphates, constitutes a minor fraction of the non-caustic soda in the contaminated process liquor. Nevertheless, it gives rise to a most serious problem in that at least a portion of the organic compounds exerts a powerful inhibiting action on the settling of the red mud ore residues during clarification of the liquor. In addition, it has previously been recognized that organic matter in the liquor inhibits auto-precipitation of alumina from sodium aluminate liquors. This adverse effect on the settling rate of the red mud in the increasingly contaminated liquor is reflected in actual practice by an increased starch consumption for equivalent settling results. However, increasing starch feed rates aggravate the problem by increasing the net concentration of organic matter as sodium organates (non-alkaline soda) in the liquor, since the starch degradation products, as well as sodium organic compounds from the organic matter in the ore, include potent settling inhibitors.

Of vital importance in the necessary production of alumina from the lower grade aluminous ores, is the effect of the settling inhibitor portion of the non-alkaline soda (sodium organates). Most of the lower grade ores, such as the West Indian bauxites and laterites, contain large fractions of mud residues (hydrated ferric oxide) of a highly dispersible, slow or substantially non-settling nature. Moreover, these lower grade ores contain higher amounts of organic matter, such as humates and the like, than the high grade trihydrate ores. Thus, the non-alkaline soda concentration of the circulating process liquor builds up to a higher level. This combination of factors actually leads to the result that no practical settling rate for the red mud can be obtained without utilization of excessive quantities of starch. As indicated above, excessive starch consumption increases the concentration of non-alkaline soda, including settling-inhibiting sodium organates, in the recycle liquor through degradation of the starch and the net effect after repeated recycling of the liquor is negative on the red mud settling rate and a further inhibition of the auto-precipitation reaction. Accordingly, efficient processing of lower grade aluminous ores such as the Jamaican type by the Bayer process without control of the deleterious sodium organates (non-alkaline soda) is not attainable. The invention of my copending application S.N. 262,808 and now abandoned is directed to a particular manner of effective control of process carbonation and recovery of the sodium carbonate, while concurrently substantially freeing the liquid of settling inhibiting sodium organates.

As described in my copending application the problems of settling and auto-precipitation are overcome by concentrating the contaminated Bayer liquors to obtain a slimy gelatinous precipitate containing sodium salts of organic substances as well as sodium carbonate, and recovering the precipitates from the concentrated Bayer liquor. The precipitates of the sodium organate compounds are extremely fine, and in fact a portion of the salts thus formed during concentration by evaporation are colloidal in nature and accordingly practically impossible to separate from the mother liquor by conventional methods. On the other hand, the sodium carbonate forms as crystals which are more easily separated from the mother liquor together with a substantial fraction of the sodium organate salts. The substantial separation of precipitated salts from the concentrated liquor is critical to the substantially complete realization of the objective of removal of the organic settling inhibitor compounds which may be contained therein with the consequent increase in mud settling rate and starch effectiveness, and to the objective of control of process carbonation.

It has been discovered that the separating of the gelatinous precipitate slurry from the liquor may best be accomplished by continuous centrifuging, the gelatinous nature of certain of the organic precipitates making filtration or decantation a practical impossibility. This is especially true in view of the large volumes of liquor necessarily handled in order to remove the relatively small amount of precipitate which forms during the liquor concentrating operation.

In general according to the process of my copending application, the concentration of the liquor should proceed to at least 350 grams per liter caustic soda (as equivalent $Na_2CO_3$) when confronted with non-caustic soda in what may be termed normal amounts, although the particular caustic soda concentration at which the gelatinous precipitate is obtained varies necessarily with the level or concentration of the non-alkaline soda impurities in the liquor (and to some extent with the varying specific composition of these impurities which is relatively unknown and indeterminable). The amounts of both the slimy gelatinous precipitate of the complex mixture of sodium organic compounds and the sodium carbonate precipitate may be increased by increasing the caustic soda concentration up to about 600 grams per liter. However, the density of the viscous caustic liquor is increased at such high concentration and tends to increase the difficulty in separation of the sludge therefrom. In regard to specific conditions of liquors investigated, it has been found that caustic soda concentrations of from about 380 to about 500 grams per liter were most advantageous.

Of importance in the method of separating the sludge containing the settling inhibiting organic compounds precipitated by the liquor concentration or "salting out" process is the method of recovering the soda which is bound in the compounds thus precipitated.

One method of recovering the soda is to mix the sludge separated from the concentrated liquor with bauxite or other alumina containing material, including red mud residues obtained from digestion of high silica containing ores, and subject the mixture to a sintering operation at appropriate temperatures, for example, 1,000 to 1,200 degrees C., preferably 1,050 to 1,150 degrees C. (or about 1,900 to 2,100 degrees F.) to destroy the organic matter, thus decomposing the sodium organates and also the sodium carbonate to form sodium aluminate with the alumina in the bauxite. Lime is also added in proper amounts to minimize the reaction of soda and alumina with the silica in the ore and subsequent loss in silicate form. The product is then leached with a dilute caustic soda solution or with dilute spent liquor and the leach liquor obtained corresponds to a green caustic aluminate liquor ready for precipitation. In this manner most of the alumina in the bauxite or aluminous material and the mother liquor is recovered, together with a substantial portion of the soda as sodium aluminate while most of the soda is also recovered as caustic soda, thus increasing the caustic soda concentration of the leach liquor.

Sodium carbonate constitutes on the order of 80% of the precipitate formed during the salting out operation, and this fraction may be directly causticized with lime to form caustic soda and insoluble calcium carbonate. Accordingly, it is highly desirable to separate the sodium carbonate fraction of the sludge from the non-causticizable fraction of the precipitates containing sodium organates in order to decrease the load on the sinter operation. Accordingly, as an alternative to the sinter method of recovering the soda a fractionation of the precipitated sludge may be accomplished to give:

(1) A high solids slurry rich in sodium carbonate, low in alumina-containing mother liquor, and low in the slimy gelatinous precipitate of sodium organates or non-alkaline soda compounds.

(2) A low solids slurry containing both sodium carbonate and substantially all of the non-alkaline soda solids of the sludge and relatively high in mother liquor containing alumina.

The carbonate rich-low alumina, low non-alkaline soda slurry is adaptable to direct causticizing to rectify the sodium carbonate to caustic soda. By recovering a substantial portion of the soda in this manner the amount of soda recovered in the sinter of the remaining sludge is appreciably reduced with an overall monetary saving in the operation as compared to a sinter of the entire sludge. It is with this particular method of liquor clarification and sludge fractionation that the present invention is concerned.

It has been discovered according to the hereinafter described invention that the causticizable sodium carbonate fraction of the precipitates formed during concentration of a Bayer plant liquor may be separated substantially from the remaining organic salts of a substantially non-causticizable nature by subjecting the total slurry to separation of the solids en masse from the concentrated caustic liquor by means of a high speed "fine centrifugal separator," as will be more fully explained subsequently; and thereafter subjecting the resulting thickened solids slurry to the action of an intermediate speed centrifuge of the "coarse centrifugal separator" type for the selective separation of the sodium carbonate from the sodium organates. "Sodium organates" as herein used refers collectively to the sodium oxalate and other organic non-alkaline soda as hereinafter defined. The invention further provides a substantially completely clarified concentrated caustic liquor for return to the main Bayer plant system.

Accordingly, it is a primary object of the present invention to provide a centrifuge system which will not only substantially clarify the concentrated caustic aluminate liquor of the difficultly separable gelatinous sludge, but which will selectively separate the lime causticizable component substantially from the non-causticizable components.

Another object of the invention is to provide a method for the primary separation of the sodium carbonate and organic precipitates from the caustic aluminate mother liquor followed by the selective separation of the organic precipitates from the major portion of the sodium carbonate.

Furthermore, it is an object of the invention to provide a centrifuge system and method for the removal of a solids sludge containing particles of near or substantially colloidal size from a viscous liquor wherein the solids are of different specific gravities and/or particle sizes and the liquor density is substantially less than that of the solid of least specific gravity, and thereafter separating a fraction of the solids of higher specific gravity and/or particle size from the solids of lower specific gravity and/or particle size.

Other objects will become apparent from the following detailed description of the invention illustrated in its preferred embodiment as applied to separation and fractionation of precipitated sludge formed on concentrating a Bayer process caustic liquor, but without limitation of the scope of the invention thereto.

As is well-known in the centrifuge art, the characteristics of a particular centrifugal separator and the method of operation define the limits regarding separating power and through-put. Thus, there are centrifuges available capable of handling large volumes of solids containing liquor which operate with a high through-put. This necessarily leads to a more or less incomplete separation of the solids and consequently this type of centrifuge, examples of which are the Bird type, such as fully disclosed in U.S. Patents Nos. 1,710,315 and 1,962,461, has been principally employed for "scalping" operations, for example, the removal of coarse particles, such as sand, prior to the further processing of the overflow and/or prior to more complete removal of the solids by other means such as filters or other types of centrifuges. In general, this type of apparatus has been labeled a "course centrifugal separator." It is to be understood that in this specification the use of the term "coarse centrifugal separator" refers to the above type of apparatus which is chiefly characterized in that the mechanical removal of solids is by a screw conveyor rotating relative to the centrifuge bowl or rotor and removing the solids generally counter to the force of gravity exerted by the centrifuge operation. This type apparatus will be more fully defined hereinbelow with reference to Figure 1.

Also well known in the art are centrifuges having a low through-put in comparison to the "coarse centrifugal separators." This type of apparatus is characterized by the discs and discharge orifice nozzles which contribute to a high degree of clarity in the overflow and are often referred to as "fine centrifugal separators," examples of which are the commercially available Sharples DH-2 Nozzle Centrifuge and the De Laval AC-VO Centrifugal Separator. Accordingly, it is to be understood that the mechanical "fine centrifugal separator" as used herein has reference to the above type centrifuges.

With respect to either type of machine a decrease in clarity necessarily follows an increase in through-put with other operating factors constant. Moreover, a higher degree of clarity may be obtained at the same through-put by increasing the r.p.m. and consequently the number of multiples of gravitational force to which the liquor is subjected. These factors are common operational and engineering factors not forming a part of the invention.

It has been discovered according to the invention that substantially all of the sodium carbonate may be removed from the concentrated viscous caustic aluminate liquor and a high degree of removal of the remaining gelatinous solid precipitates obtained by subjecting the sludge-containing liquor to the action of a fine centrifugal separator. Moreover, it has been discovered that by thereafter subjecting the more concentrated or thickened solids slurry obtained from the fine centrifugal separator to the action of a coarse centrifugal separator substantially complete removal of a sodium carbonate fraction from the solid sodium organates or other precipitated material may be obtained. A major advantage of this discovery is that a causticizable product may be secured substantially free of non-causticizable solids with a resultant decrease in the sinter requirements for the recovery of the soda contained in the precipitated slurry.

The invention will be more fully understood with reference to the accompanying figures and tables.

Figure 3 is an overall flow sheet covering the salting out, centrifuging, causticizing, sinter and leaching system according to the conditions shown.

Figure 1:
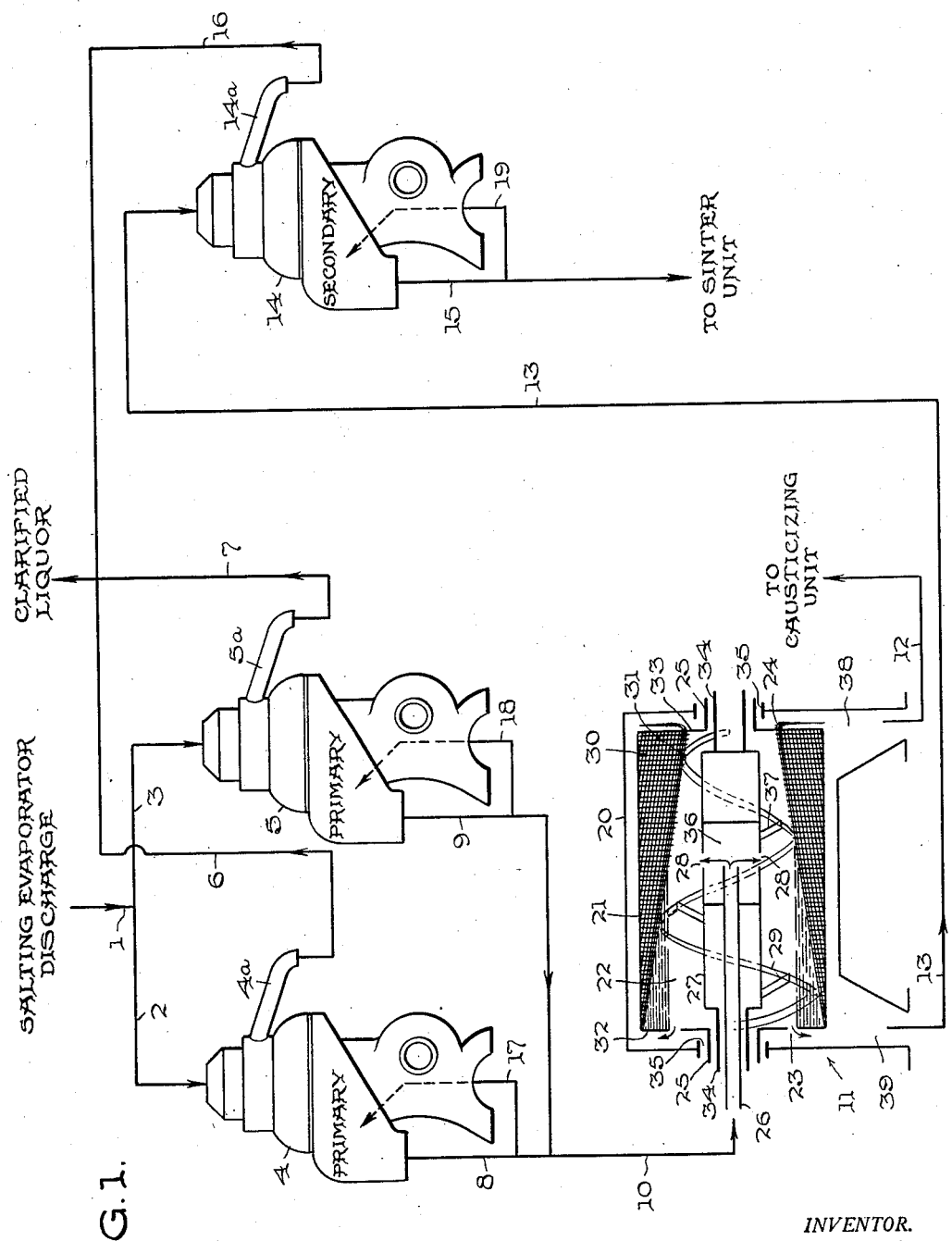
Figure 1 is a schematic diagram showing the preferred system of the fine and coarse centrifugal separators of the herein described invention.

Referring now to Figure 1, there is provided two primary fine centrifugal separators operated in parallel so as to remove en masse the total sludge, that is, both the sodium carbonate and sodium organate solids from the viscous mother liquor to the desired concentration of solids for the feed to the coarse centrifugal separator wherein the slurry containing precipitates of both sodium organates and sodium carbonate is subjected to separation into a fraction of the sodium carbonate component and a fraction containing substantially all of the non-causticizable soda solids.

4, 5 and 14 represent the fine centrifugal separators of the disc type having orifice type discharge nozzles. Speeds of the order of 6,000 r.p.m., thus developing about 9,000 g.'s at a maximum bowl diameter of 18 inches are common with this type of apparatus although by no means a limiting feature of the apparatus as applied to this invention.

11 is a coarse centrifugal separator of the "Bird" type developing about 255 g's at an 18 inch bowl diameter for about 1,000 r.p.m. The coarse centrifugal separator 11 comprises a hollow rotor 21 mounted in a stationary housing or frame 20. The rotor is provided with hollow shafts 25 at opposite ends which are supported in the stationary housing 20 by suitable horizontally placed bearings (not shown). The rotor 21 contains a centrifugal separating chamber 22 containing a beach 30 of inert material which retains its position during operation thus causing the effective separating chamber 22 to taper from the large end 32 to the small end 33. It is to be understood that some models of the coarse centrifugal separators comprise a rotor which is tapering itself, following the contours defined by the beach at the surface where the solids separate out and accordingly such apparatus is also included in the specification and appended claims when a "coarse centrifugal separator" is referred to. In the large end 32 of the separating chamber are openings 23 forming an outlet for the overflowing liquor and solids that have not settled out of the liquor. At the small end of the rotor are openings 24 for the solids discharge located at a smaller radius than the opening 23 for the overflow. The periphery of the effective separating chamber between ends 32 and 33 is frusto-conical in form and forms within the chamber a path for conveying the separated solids to the sludge outlets 24.

A cylindrical distributor 27 is mounted in the rotor 21 and is rotatable relative thereto on the same axis as the rotor. This hollow distributor 27 has hollow shafts 34 which support the distributor 27 within the hollow shafts 25 which in turn support the rotor 21. The distributor shafts 34 and the surrounding rotor shafts 25 extend through openings 35 defined by the housing 20 at opposite ends and are arranged to be driven so that the rotor 21 rotates at a somewhat higher speed than the distributor 27. An example of the differential drive arrangement is shown in Patent No. 1,962,461 issued to E. G. Piper.

Feed tube 26 extends through the hollow shaft 34 of the distributor 27 at the larger end and into the distributor 27 itself and forms an inlet for the mixture to be separated. The discharge end of the feed tube 26 terminates in a chamber 36 having peripheral openings 28 through which the mixture from the feed tube 26 passes outward under centrifugal force into the separating chamber 22. The distributor openings 28 are positioned to deliver the mixture to the tapered periphery of the effective separating chamber at a region where the periphery of the effective separating chamber 22 is at approximately the same radius as the effluent outlets 23.

A conveyor 29 is mounted in the separating chamber 22 and is rotatable relative to the rotor 21. As shown, the conveyor is in the form of a helix or screw and is secured to the distributor 27 in any suitable manner, as by means of connections 37 so that the screw conveyor 26 rotates with the distributor 27. The outer edge of the conveyor 29 is closely adjacent the tapered inner surface of the beach 30 and the conveyor extends from the larger end 32 of the effective separating chamber or zone to the smaller end 33. Since the conveyor screw rotates with the distributor at a lower speed than the rotor 21, it is adapted to transport separated sludge inward along the tapered surface of the beach 30 to the sludge outlets 24.

The stationary housing 20 has a collecting chamber 38 which receives the sludge discharge through outlets 24. The housing also as a collecting chamber 39 which receives the effluent discharge through outlets 23.

The method of the invention may be described with reference to the centrifugal system of Figure 1 as applied to a precipitated sludge of sodium carbonate and gelatinous organic substances, probably of sodium salt character obtained by concentrating a Bayer plant spent liquor. The underflow from the salting evaporator containing both sodium carbonate and sodium organate salts (non-alkaline soda solids) in the form of a viscous gelatinous sludge is fed to the primary separation system through pipe 1 and branch pipes 2 and 3. As shown two fine centrifugal separators 4 and 5 operated in parallel comprise the primary separation system. However, it is to be understood that any number may be used depending on the capacity of the respective machines and demands of the operation. Substantially all of the sodium carbonate and about one-half or more of the sodium organate solids are separated during the primary separation and are led from primary separators 4 and 5 by means of underflow pipes 8 and 9 wherein they are combined in pipe 10 to form the feed to the selective centrifuge 11.

The substantially clarified liquor overflows through spouts 4a and 5a on primary separators 4 and 5, respectively into pipes 6 and 7 for return to the main liquor stream. Depending on the degree of clarity demanded by the operation, the liquor in the overflow from the fine centrifugal separators may be further clarified by suitable means not shown if necessary.

The underflow from the primary centrifuges is combined in pipe 10 and fed to the coarse centrifugal separator 11 wherein the selective separation of the solid sodium carbonate from the sodium organates takes place. The slurry enters feed pipe 26 and is discharged into chamber 36 of the hollow distributor 27 which discharges the slurry into the separating chamber 22 through peripheral openings 28. The solid sodium carbonate separates from the mother liquor containing the sodium organate solids along the beach 30 by centrifugal force forming a carbonate sludge 31 which is conveyed from the chamber by means of the screw 29 through port 24 to the solids collecting chamber 38. Thereafter, the solid sodium carbonate is transported to the lime causticizing unit by suitable means 12. The solid sodium organates are not separated from the mother liquor during the coarse centrifugal separation and accordingly collect at the large end of the effective separating zone 22 and overflow through ports 23 into the overflow collecting chamber 39 wherein they are collected and transported by means of pipe 13 to the secondary fine centrifugal separator 14. Herein the non-alkaline soda solids are concentrated in the underflow and led by means of pipe 15 to the sinter unit. The substantially clarified liquor overflows into the overflow spout 14a and is returned to the system through pipe 16. Like the overflow from the primarys, the overflow from the secondary 14 may also be further clarified where deemed necessary.

Solids recycle pipes 17, 18 and 19 are provided on primary fine separators 4 and 5 and secondary fine separator 14, respectively for controlling the solids content in the discharge from the orifice type nozzles as is well known in the art.

Figure 2:
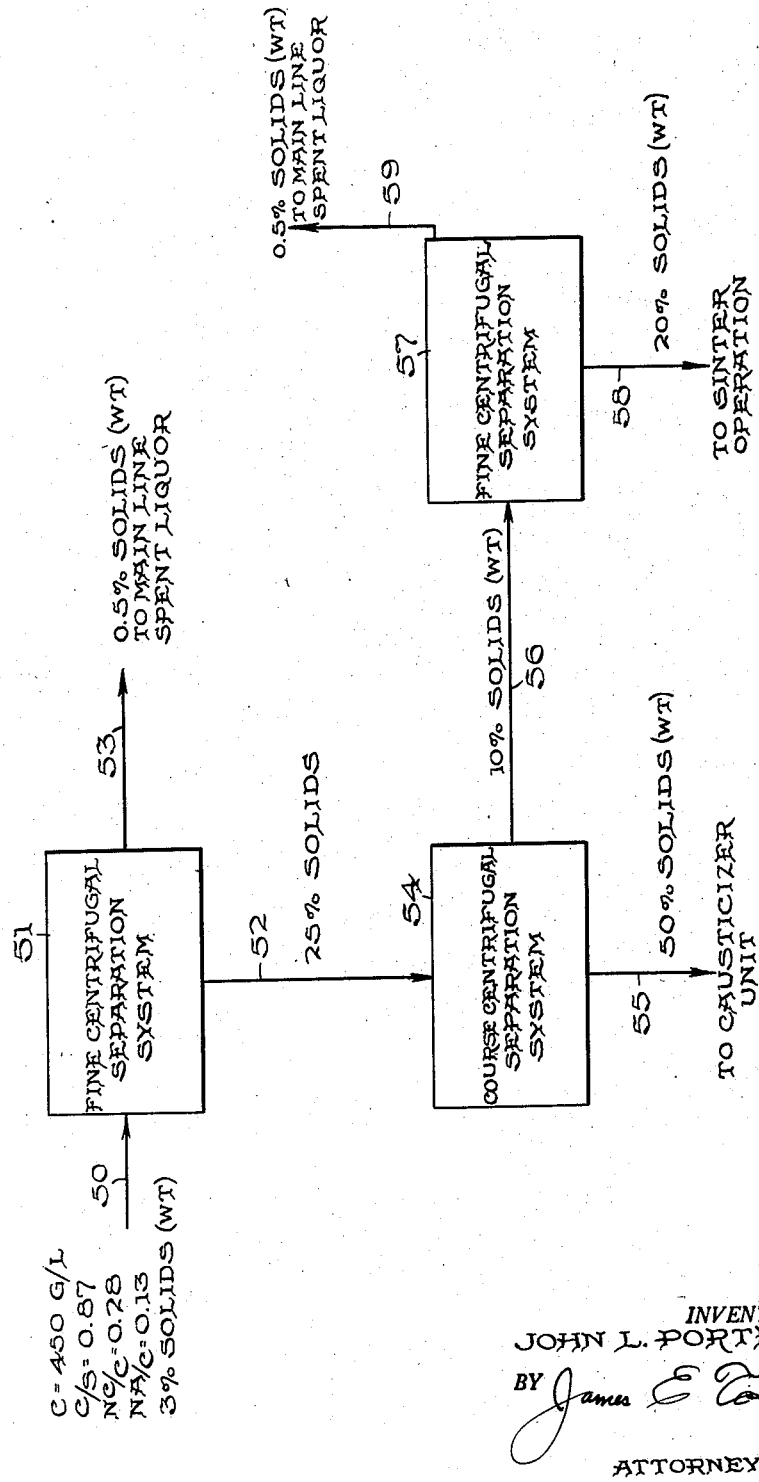
Figure 2 is a schematic flow diagram showing one embodiment by which the sludge in the concentrated liquor is separated by selective centrifuging into separate fractions, one constituting causticizer feed and the other constituting the feed to the sinter operation as indicated in Figure 3.

Referring to Figure 2 there is shown a schematic flow diagram of one embodiment of the invention by which the sludge in the concentrated liquor is separated by selective centrifuging into the two separate fractions, one constituting causticizer feed and comprising principally sodium carbonate and other constituting the feed to the sinter operation and containing substantial amounts of the remaining organic precipitates as indicated in Figure 3.

A concentrated Bayer process spent liquor having the analysis as indicated in Figure 2 and containing the precipitated sludge in the amount of about 3% solids by weight is charged through line 50 to a high speed disc-type fine centrifugal separation system 51 where the sludge is concentrated to about a 25% solids slurry discharged as underflow at 52 and the clarified liquor containing only about 0.5% solids by weight is recycled to the mainline spent liquor through line 53. The partially concentrated sludge is introduced into a centrifuge of the solid bowl type or coase centrifugal separator 54 wherein it is centrifuged at intermediate or moderately slow speeds to produce an underflow 55 of about 50% solids by weight containing substantially all of the solids as sodium carbonate as indicated in Figure 3. This constitutes the feed to the causticizer unit. This high solids slurry advantageously contains a minimum amount of alumina having been thickened to a high solids content so that the loss of alumina as calcium aluminate upon reaction with lime in the causticizing unit is reduced as far as possible. The overflow from the bowl type centrifuge containing about 10% solids by weight and a major portion of the non-alkaline soda or sodium organate compounds is introduced through line 56 to another high speed fine centrifugal separation system 57 wherein the sludge is concentrated to around 20% solids slurry (by weight). This underflow 58 constitutes the feed to the sinter operation set out in Figure 3. The overflow from centrifuge 57 is passed through line 59 to the mainline spent liquor system along with the overflow from the centrifuge system indicated at 51, both of which contain only about 0.5% solids by weight.

Now referring particularly to Figure 3, there is shown the overall relation of the centrifuge system of the present invention to the preceding salting evaporation, and subsequent causticizing, sintering and leaching systems of my copending application Serial No. 262,808 and now abandoned. A selected fraction of contaminated spent liquor to be purified having the analysis indicated on the flow sheet is introduced through line 60 into a salting type evaporator 61 wherein the liquor is concentrated to a caustic soda concentration of 450 g./l. to obtain a slimy gelatinous precipitate of a portion of the non-alkaline soda or sodium organates and a precipitate of sodium carbonate. The precipitated sludge of non-caustic soda compounds constitutes 3% by weight of the salting evaporator effluent.

The effluent liquor from salting evaporator 61 is passed through line 62 to the centrifuging operation indicated at 63 where the sludge is concentrated and separated from the concentrated liquor to produce a highly clarified liquor containing only 0.5% solids by weight which is recycled to the mainline spent liquor as indicated. The thickened sludge, as shown in Figure 2 is separated by the centrifuging operation into two fractions as separate centrifuged underflows. One fraction of this solids content, namely 50% solids by weight containing 95.8% of its solids as sodium carbonate, is subjected to direct causticizing by passing the slurry through line 64 to the causticizing unit 65. Only a very low content of non-alkaline soda is present in the sludge of this slurry and also in the liquor associated with the sludge. As a consequence, the non-caustic soda content of the slurry is substantially all in the form of the readily causticizable sodium carbonate with a minimum content of non-causticizable or difficulty causticizable non-alkaline soda compounds or sodium organates. This liquor is diluted by the addition of water as indicated at 66 to adjust the caustic soda concentration of the liquor in the causticizing unit to a low value which will permit approximately maximum efficiency of the causticizing reaction conducted therein, that is, not less than about 90% conversion of the sodium carbonate charged to the unit. The feed to the causticizing unit may be fortified by the addition of fresh soda ash as indicated at 67 in the flow sheet. The lime for causticizing is charged at 68 into the causticizing unit with 1.05 mols of lime being charged for each mol of sodium carbonate in the liquor to be causticized. The causticizing operation is conducted at a total soda concentration of 150 g./l. at the atmospheric boiling point of the liquor and produces a causticizer effluent as indicated at 69 having a caustic soda concentration of 135 g./l. and a total soda concentration of 150 g./l. indicating that the causticizing unit operates at a conversion factor of about 90%. The caustic soda to total soda ratio in the causticizer effluent liquor will vary somewhat depending upon the relative proportions of soda ash contributed by the centrifuge underflow slurry and by the fresh soda ash. For example, with 100% soda ash feed a C/S ratio of 0.953 has been obtained while with a 50% soda ash—50% centrifuge underflow feed to the causticizer a C/S ratio of 0.923 has been obtained.

The second fraction of separated precipitated sludge thickened to a 20% by weight solids content contains 81.5% of the solids as sodium carbonate with a high concentration of 18.5% of its solids as non-alkaline soda, that is, sodium organates precipitated from the liquor by concentration. This fraction is passed through line 70 to a sinter operation 71 wherein it is mixed with bauxite ore in amount to give about .908 mols of alumina in the mixture per mol of soda in the sludge slurry from line 70. Also, lime is added in the amount of 2.1 mols per mol of silica in the ore charged to the sinter operation in order to minimize loss of alumina from the bauxite and from the sludge as insoluble sodium aluminum silicate. The sinter charge adjusted to the proper solids content is heated to a temperature approximating 1,950 degrees F. after which the sintered product is charged through line 72 to a leaching system. The sinter product is leached at 73 by the addition of causticizer effluent liquor through line 74 diluted at 75 with water. In the sintering operation substantially all of the non-caustic soda of the sludge is converted to sodium aluminate which is dissolved in the leaching system 73 by the diluted causticizer effluent liquor to produce a leaching effluent 76 which is a sodium aluminate enriched caustic liquor having an alumina to caustic ratio of 0.60 and a caustic concentration of 170 g./l. The leaching system effluent is also fortified in caustic soda from the soda produced in the sintering operation in excess of the amount combined with the alumina of the ore. This liquor corresponding to Bayer process pregnant liquor may then be cycled to the main plant precipitators for recovery of the alumina after separation of the insoluble residue as at 77 while the causticizer effluent is combined with the clarified concentrated caustic liquor from the centrifuge operation and the untreated spent liquor for recycling to the main plant digesters of the continuous Bayer process.

The table hereinbelow is a material balance based on analytical results obtained during a typical run of the herein disclosed method of clarifying concentrated Bayer plant liquors of the solids and thereafter separately recovering the solid sodium carbonate and the solid organic substances (non-alkaline soda). The particular operating conditions upon which the material balance is based are as follows:

Feed rate to salting evaporator __ 135 g.p.m.
Liquor temperature in evaporator . 255° F.
Feed rate to primarys _____ 42 g.p.m./centrifuge.
    Number of primarys _____ 2.
    Maximum g's developed ____ 9,800.
Feed rate to selective separator __ 18.3 g.p.m.
    Number of separators _____ 1.
    Maximum g's developed ____ 1,020.
Feed rate to secondary _____ 15.45 g.p.m.
    Number of secondarys _____ 1.
    Maximum g's developed ____ 9,800.

The following methods of analysis and reporting were used as a basis for the material balance:

$Al_2O_3$ (alumina): This is a measure of the alumina as determined by carbonation and reported as corrected for 0.8 of the $SiO_2$ and all of the $P_2O_5$ and $V_2O_5$.
C.S. (caustic soda): This is determined by titration on a standard precision scientific titrometer for the free caustic and reported with the calculated caustic bound with the alumina.
Carbonate soda: This is determined by standard alkalimetric methods based on $CO_2$ evolved.
T.S. (total soda): This is the sum of the caustic soda and carbonate soda.
T. Na (total sodium): This is determined by the standard uranyl zinc acetate method of measuring the total sodium ion present.
Oxalate soda: This is determined by a perchlorate-cerate titration and is a relative measure of the amount of soda bound with oxalate radicals.
Inorganic non-alkaline soda: This is the sum of the soda bound with silicate, phosphate, vanadate, chloride and sulphate. The $SiO_2$, $P_2O_5$ and $V_2O_5$ are determined by standard colorimetric methods. The chloride is determined by a precipitation titration with $AgNO_3$ and the sulfate is determined in standard gravimetric methods with barium sulfate.
Total non-caustic soda: This is the difference between the total sodium and the caustic soda.
Total non-alkaline soda: This is the difference between the non-caustic soda and the carbonate soda.
Organic non-alkaline soda: This is the difference between the total non-alkaline soda and the sum of the oxalate soda and inorganic non-alkaline soda.

The total flow is based on actual weights whereas the soda values are reported as equivalent $Na_2CO_3$.

The table clearly indicates the degree of separation obtained in the primary fine centrifugal separators for this particular operation. Of the total solids fed to the primarys $$\frac{.1635}{.2030} \times 100 = 80.5\%$$

are separated into the primary underflow which ultimately is the feed to the selective separator. Of the solid sodium carbonate formed in the salting operation $$\frac{.1492}{.1520} \times 100 = 98\%$$

is separated and of the total non-alkaline salts formed $$\frac{.0166}{.0364} \times 100 = 45.5\%$$

is found in the primary underflow. Moreover, since the total non-alkaline term contains organic, inorganic and oxalate soda, $$\frac{.0102}{.0166} \times 100 = 61.5\%$$

of this is oxalate soda and $$\frac{.0031}{.0166} \times 100 = 18.65\%$$

is organic soda or about 80% of the non-alkaline soda solids recovered are organic compounds which adversely affect the settling of the red mud and/or alumina auto-precipitation.

The selective separatory function of the coarse centrifugal separator is clearly brought out by examination of the overflow and underflow of the selective separator in comparison to the feed, i.e., the primary underflow. Of the total solid non-caustic soda which includes both the carbonate soda and total non-alkaline soda removed in the underflow of the selective separator, $$\frac{.0935}{.0967} \times 100 = 96.7\%$$

is carbonate soda, whereas only $$\frac{.0557}{.0690} \times 100 = 80.8\%$$

of the solids in the overflow is carbonate soda. The underflow of the selective separator is thus substantially all readily lime causticizable $Na_2CO_3$ whereas about 20% of the solids in the overflow are non-alkaline soda compounds not readily causticizable with an alkaline earth hydrate from which the bound soda may be rectified to caustic by the sinter method.

Although the data presented in the above table is based on one set of operating conditions it is not to be construed as limiting the scope of the invention in any way but rather is presented merely as an example of one embodiment of the invention. Higher speeds and lower through-put result in a greater separation in the primary stage of the centrifuge operation.

For the selective separatory operation the desideratum is to obtain an underflow high in solids which contain sodium carbonate with a minimum amount of solids as sodium organates (oxalate soda and organic non-alkaline compounds) because these compounds are not readily causticizable with lime and because of the low caustic concentration required for efficient causticizing, they merely go back into solution and are returned to the main liquor stream wherein their adverse effect on settling and auto-precipitation is once again realized. Accordingly, for each particular apparatus of the type labeled "coarse centrifugal separator" there is an optimum method of operation wherein the high sodium carbonate underflow may be obtained. In general the amount of solids in the feed, the through-put, size of the bowl and/or g's (multiples of gravity) developed are the most influencing. Thus, besides the particular operation of the coarse centrifugal separator, prior processing of the solids to a proper concentration in the feed is of contributing importance.

The herein described apparatus and method of operation may also advantageously be used in other clarification and selective separation operations wherein mixtures of solid particles of different specific gravities and/or particle size may be separated from a viscous liquor of lesser, density, and the solids then fractionated. The main advantage in using this arrangement lies in the fact that fewer pieces of apparatus are required to get the desired classification results. Thus, if a coarse centrifugal separator is used as a scalper of the higher density solids in the first instance, the load on the subsequent fine centrifugal separation is not diminished because of the relatively high amount of liquor going out the overflow of the coarse centrifugal classifier. Moreover, the number of coarse centrifugal separators will necessarily be increased when they are used prior to the fine centrifugal separators for the same reason, i.e. the greater through-put requirements on a lower solids content liquor. Accordingly, although the invention is in no way limited to the number of primary fine centrifugal separators, or intermediate coarse separators, in its generic aspect it contemplates a centrifugal system particularly applicable to a low solids slurry as feed to a primary high speed centrifugal clarification and thickening, followed by an intermediate coarse centrifugal fractionation of the solids in the thickened primary underflow, and high speed or fine centrifugal clarification of the coarse centrifugal separation overflow.

TABLE I

Basis: Pounds of component per pound caustic soda to evaporator

|  | Evap. Discharge | | Primary | | | | Selective Separator | | | | Secondary | | | |
| --- | --- | --- | --- | --- | --- | --- | --- | --- | --- | --- | --- | --- | --- | --- |
|  | | | Overflow | | Underflow | | Overflow | | Underflow | | Overflow | | Underflow | |
|  | Liquid | Solid | Liquid | Soild | Liquid | Solid | Liquid | Solid | Liquid | Solid | Liquid | Solid | Liquid | Solid |
| Total Flow | 3.2250 | .2030 | 2.5533 | .0395 | .6718 | .1635 | .6142 | .0654 | .0575 | .0980 | .3828 | .0005 | .2315 | .0649 |
| $Al_2O_3$ | .3260 |  | .2581 |  | .0679 |  | .0621 |  | .0058 |  | .0387 |  | .0234 |  |
| O.S. | 1.0000 |  | .7916 |  | .2084 |  | .1906 |  | .0178 |  | .1187 |  | .0718 |  |
| T.S. | 1.1014 | .1520 | .8718 | .0028 | .2295 | .1492 | .2099 | .0557 | .0196 | .0935 | .1308 | .0004 | .0791 | .0553 |
| T. Na | 1.2607 | .1884 | .9981 | .0226 | .2626 | .1658 | .2401 | .0690 | .1496 | .0967 | .1496 | .0055 | .0905 | .0636 |
| Oxalate Soda | .0195 | .0260 | .0159 | .0157 | .0041 | .0102 | .0037 | .0088 | .0003 | .0014 | .0023 | .0038 | .0014 | .0051 |
| Inorg. Non-Alk. Soda | .0235 | .0068 | .0186 | .0035 | .0049 | .0033 | .0045 | .0016 | .0004 | .0017 | .0028 | .0005 | .0017 | .0012 |
| Org. Non-Alk. Soda | .1164 | .0036 | .0923 | .0006 | .0241 | .0031 | .0220 | .0029 | .0021 | .0001 | .0137 | .0008 | .0083 | .0021 |
| Total Non-Alk. Soda | .1594 | .0364 | .1263 | .0198 | .0331 | .0166 | .0302 | .0133 | .0028 | .0032 | .0188 | .0051 | .0114 | .0084 |
| Carb. Soda | .1014 | .1520 | .0802 | .0028 | .0211 | .1492 | .0193 | .0557 | .0018 | .0935 | .0120 | .0004 | .0073 | .0553 |
| Total Non-Caus. Soda | .2608 | .1884 | .2065 | .0226 | .0542 | .1658 | .0495 | .0690 | .0046 | .0967 | .0308 | .0055 | .0187 | .0636 |

I claim:

1. A process for clarification of viscous concentrated caustic liquors containing finely divided solids of different specific gravities and particle size and for fractionating the solids content, the liquor having a density substantially less than that of the solid of least specific gravity, which comprises mechanically separating substantially all of the solids from the liquor by high speed fine centrifugal clarification, subjecting the thickened solids underflow slurry of the fine centrifuging to an intermediate speed coarse centrifugal mechanical separation to produce a more concentrated underflow fraction of solids consisting substantially entirely of the relatively higher specific gravity and relatively larger particle size, and a less concentrated solids overflow slurry containing a major portion of the solids of relatively lower specific gravity and relatively smaller particle size, and subjecting the overflow from the coarse centrifugal separation to high speed fine mechanical centrifuging to substantially completely clarify the liquor and to recover a more concentrated slurry of solids of relatively lower specific gravity and relatively smaller particle size.

2. A process for the clarification of concentrated caustic aluminate liquors containing finely divided solids of the sodium carbonate and sodium organic compound types, and for selective separation of the sodium carbonate from the sodium organic compounds, which comprises mechanically separating substantially all of the solids from the liquor by high speed fine centrifugal clarification, subjecting the thickened solids underflow slurry of the fine centrifuging to an intermediate speed coarse centrifugal mechanical separation to produce a more concentrated underflow fraction of solids which is substantially all sodium carbonate and a less concentrated solids slurry as the overflow fraction containing the predominant portion of the sodium organic compound type solids present in the underflow slurry from the fine centrifuging, and subjecting the overflow from the coarse centrifugal separation to high speed fine mechanical centrifuging to substantially completely clarify the liquor and to recover a more concentrated slurry of sodium organic compound type solids.

3. In a process for the clarification of concentrated caustic aluminate liquors containing a precipitated solids content of a gelatinous nature comprising lime causticizable and non-causticizable salts, the method of separating the lime causticizable from the non-causticizable salts, which comprises subjecting the low solids liquor to high speed fine mechanical centrifuging to substantially completely clarify the liquor as overflow and to produce a more concentrated solids slurry as underflow, and subjecting the thickened underflow slurry of the fine centrifuging to an intermediate speed coarse centrifugal mechanical separation to produce a more concentrated underflow fraction of solids which is substantially all lime causticizable salts, and a less concentrated overflow fraction containing substantially all of the noncausticizable salts.

4. A process for clarifying viscous concentrated aqueous liquors containing slimy, gelatinous, finely divided solids of different specific gravities and particle size, and for fractionating the solids into two portions, one of relatively larger particle size, higher specific gravity solids and the other of relatively smaller particle size ranging to the colloidal state, lower specific gravity solids, the aqueous liquor having a density substantially less than that of the solids of least specific gravity, which comprises mechanically separating substantially all of the solids from the liquor by high speed fine centrifugal clarification, subjecting the thickened solids underflow slurry of the fine centrifuging to an intermediate speed coarse centrifugal mechanical separation to produce a more concentrated underflow fraction of solids consisting substantially entirely of the relatively higher specific gravity and relatively larger particle size, and a less concentrated solids overflow slurry containing a major portion of the solids of relatively lower specific gravity and relatively smaller particle size and subjecting the overflow from the coarse centrifugal separation to high speed fine mechanical centrifuging to substantially completely clarify the liquor and to recover a more concentrated slurry of solids of relatively lower specific gravity in relatively smaller particle size.

5. A process for clarifying viscous concentrated aqueous liquors containing slimy, gelatinous, finely divided solids of two different chemical compounds, the finely divided solids of one of said compounds having relatively larger particle sizes and higher specific gravity, the finely divided solids of the other of said compounds having relatively smaller particle sizes ranging to the colloidal state and lower specific gravity, and for selective separation of the finely divided solids from each other and from the liquor, which comprises mechanically separating substantially all of the solids from the liquor by high speed fine centrifugal clarification, subjecting the thickened solids underflow slurry of the fine centrifuging to an intermediate speed coarse centrifugal mechanical separation to produce a more concentrated underflow fraction of solids which is substantially all of the said larger particle size chemical compound and a less concentrated solids slurry as the overflow fraction containing the predominant portion of the said smaller particle size chemical compound present in the underflow slurry from the fine centrifuging, and subjecting the overflow from the coarse centrifugal separation to a high speed fine mechanical centrifuging to substantially completely clarify the liquor and to recover a more concentrated slurry of the said smaller particle size chemical compound.

References Cited in the file of this patent

UNITED STATES PATENTS

| | | |
|---|---|---|
| 2,085,538 | Lyons | June 29, 1937 |
| 2,280,998 | Brown | Apr. 28, 1942 |
| 2,522,605 | Cundiff | Sept. 19, 1950 |
| 2,543,281 | Ferrin | Feb. 27, 1951 |
| 2,557,629 | Boivinet | June 19, 1951 |
| 2,596,616 | Strezynski | May 13, 1952 |
| 2,614,110 | Davis | Oct. 14, 1952 |

UNITED STATES PATENT OFFICE

CERTIFICATE OF CORRECTION

Patent No. 2,889,982                      June 9, 1959

John L. Porter

It is hereby certified that error appears in the printed specification of the above numbered patent requiring correction and that the said Letters Patent should read as corrected below.

Column 6, line 34, for "limting" read -- limiting --; column 7, line 26, for "also as" read -- also has --.

Signed and sealed this 4th day of April 1961.

(SEAL)
Attest: ERNEST W. SWIDER

Attesting Officer

ARTHUR W. CROCKER
Acting Commissioner of Patents